United States Patent
Moselle

(10) Patent No.: US 7,193,152 B2
(45) Date of Patent: *Mar. 20, 2007

(54) FIRE RESISTANT BARRIER

(76) Inventor: Happy Moselle, 13220 Birchwood La., Burnsville, MN (US) 55337

( * ) Notice: Subject to any disclaimer, the term of this patent is extended or adjusted under 35 U.S.C. 154(b) by 0 days.

This patent is subject to a terminal disclaimer.

(21) Appl. No.: 11/380,740

(22) Filed: Apr. 28, 2006

(65) Prior Publication Data

US 2006/0272858 A1 Dec. 7, 2006

Related U.S. Application Data

(63) Continuation of application No. 11/142,568, filed on Jun. 1, 2005.

(51) Int. Cl.
 *H02G 3/08* (2006.01)
(52) U.S. Cl. .......................... 174/50; 174/480; 174/58; 174/63; 174/64; 248/343; 52/232; 200/302.3
(58) Field of Classification Search ................ 174/480, 174/481, 50, 57–58, 63–64; 248/343, 906; 439/535, 536; 220/4.02, 3.8, 3.2–3.5; 52/232, 52/220.1; 200/302.3
See application file for complete search history.

(56) References Cited

U.S. PATENT DOCUMENTS

| | | | |
|---|---|---|---|
| 3,622,029 A | 11/1971 | Ware | |
| 3,690,501 A | 9/1972 | Ware | |
| 3,803,341 A | 4/1974 | Klinkman et al. | |
| 3,917,101 A | 11/1975 | Ware | |
| 3,980,197 A | 9/1976 | Ware | |
| 4,163,137 A * | 7/1979 | Close, Jr. ................. | 200/302.3 |
| 4,270,318 A * | 6/1981 | Carroll et al. .................... | 52/1 |
| 4,432,465 A * | 2/1984 | Wuertz ....................... | 220/235 |
| 4,605,139 A | 8/1986 | Dacar | |
| 4,616,104 A | 10/1986 | Lindsey | |
| 4,667,840 A * | 5/1987 | Lindsey ...................... | 220/3.2 |
| 4,850,173 A | 7/1989 | Beyer et al. | |

(Continued)

FOREIGN PATENT DOCUMENTS

JP  6 78434  3/1994

(Continued)

OTHER PUBLICATIONS

*Fire Resistance Ratings—ANSI/UL 263, Guide Information for Fire Resistance Rating*, Online Certifications Directory, http://database.ul.com/cqi-bin/XYV/emplate/LISEXT/1FRAME/showpage.html?&name=BXUV.GuideInfo&ccnshorttitle=Fire&Resls Jul. 2, 2002, pp. 1-41.

(Continued)

*Primary Examiner*—Dhiru R. Patel
(74) *Attorney, Agent, or Firm*—Crompton, Seager & Tufte LLC

(57) ABSTRACT

A fire resistant assembly, which may include a first layer having a lumen therein, a second layer adjacent the first layer, a first structural member disposed between the first and second layers, and a box having a cavity defined by a wall, a first opening in the wall, a second opening in the wall, a panel having a panel opening fastened to the box about the second opening, and a fixture installed in the cavity and having conduit extending through the second opening and the panel opening.

32 Claims, 4 Drawing Sheets

U.S. PATENT DOCUMENTS

| | | |
|---|---|---|
| 5,012,043 A | 4/1991 | Seymour |
| 5,456,050 A | 10/1995 | Ward |
| 5,461,838 A | 10/1995 | Heller |
| 5,609,006 A | 3/1997 | Boyer |
| 5,675,125 A * | 10/1997 | Hollinger .................... 174/66 |
| 5,750,927 A | 5/1998 | Baltazar |
| 5,887,396 A | 3/1999 | Thoreson |
| 6,105,334 A | 8/2000 | Monson et al. |
| 6,119,411 A | 9/2000 | Mateu Gil et al. |
| 6,252,167 B1 | 6/2001 | Rose |
| 6,357,891 B1 | 3/2002 | Newbold et al. |
| 6,360,502 B1 | 3/2002 | Stahl, Jr. |
| 6,412,249 B1 | 7/2002 | Boyer et al. |
| 6,698,146 B2 | 3/2004 | Morgan et al. |
| 6,838,618 B2 | 1/2005 | Newbold et al. |

FOREIGN PATENT DOCUMENTS

| | | |
|---|---|---|
| JP | 6 86424 | 3/1994 |
| JP | 6 98441 | 4/1994 |

OTHER PUBLICATIONS

*Fire Resistance*, Design Solutions-Fire Construction-Fire Tests-Fire Resistance, http://www.usg.com/Design_Solutions/2_2_10_fire_endure.asp Jul. 2, 2002, pp. 1-5.

*Fire Resistance Ratings-ANSI/UL 263, Guide Information*, Online Certifications Directory, http://database.ul.com/cgi-bin/XYV/template/LISEXT/1FRAME/showpage.html?name=BXUV.L528&ccnshorttitle=Fire+Resistances+ Jul. 2, 2002, pp. 1-12.

* cited by examiner

FIRE RESISTANT BARRIER

This application is a continuation application of U.S. application Ser. No. 11/142,568 filed Jun. 1, 2005.

FIELD OF THE INVENTION

The invention relates to a fire barrier having a recess for a device. More particularly, the invention relates to a recessed box installed in a building for use with maintaining a minimum fire endurance of a building surface.

BACKGROUND OF THE INVENTION

Typically, a surface of a building such as a floor or a ceiling provides a fire barrier. A fire barrier resists the spread of a fire through it by providing a resistance to flammability, a resistance to heat transmission, and sufficient structural integrity to resist decomposing when exposed to heat or flames. The effectiveness of a fire barrier is often rated by exposure to a fire of specified and increasing intensity and a rating is a period of time, typically in hours during which the fire barrier is effective. When an aperture is made in one of these fire barriers, the effectiveness of the fire barrier is decreased dramatically. Often it is nonetheless desirable to create an aperture in a fire barrier, for example, to install recessed lighting or a floor drain. To restore the fire barrier and maintain an effective minimum resistance to fire, a construction worker will typically build a box of gypsum board and install it around the recessed fixture proximate the aperture created in the fire barrier. The construction of this box is a time-consuming task and provides no mechanism to ascertain to what degree the effectiveness of the fire barrier is restored. Moreover, many fixtures have large conduits such as pipes or cable servicing them. Constructing a box that provides egress for these conduits while maintaining integrity as a fire barrier is often a time-consuming and chancy process. It is also frequently difficult to install a fixture such as a box light into a fire box that is only slightly larger.

SUMMARY OF THE INVENTION

One embodiment pertains to a fire resistant box to maintain the integrity of a fire barrier in a building, while permitting the easy installation of a recessed fixture such as a light. The box may be made from steel or other suitable material and may have a flange for convenient mounting to structural members such as ceiling joists or wall studs. The box has a first opening through which the fixture may be mounted and a second opening which provides access to provide service to the fixture. The second opening has a first larger size for use when installing the box and the fixture into the box and a reduced size for allowing conduit such as electrical cable through the box wall while maintaining the integrity of the fire barrier. The second opening may be reduced in size by installing a panel on the box. In one embodiment, shifting the location of the panel may shift the location of the reduced state second opening. Another contemplated embodiment permits the use of the fire resistant box in a hanging ceiling.

The above summary of some embodiments is not intended to describe each disclosed embodiment or every implementation of the present invention. The figures and detailed description which follow more particularly exemplify these embodiments.

BRIEF DESCRIPTION OF THE DRAWINGS

The invention may be more completely understood in consideration of the following detailed description of various embodiments of the invention in connection with the accompanying drawings in which.

DETAILED DESCRIPTION OF ILLUSTRATIVE EMBODIMENTS

Figure 1:
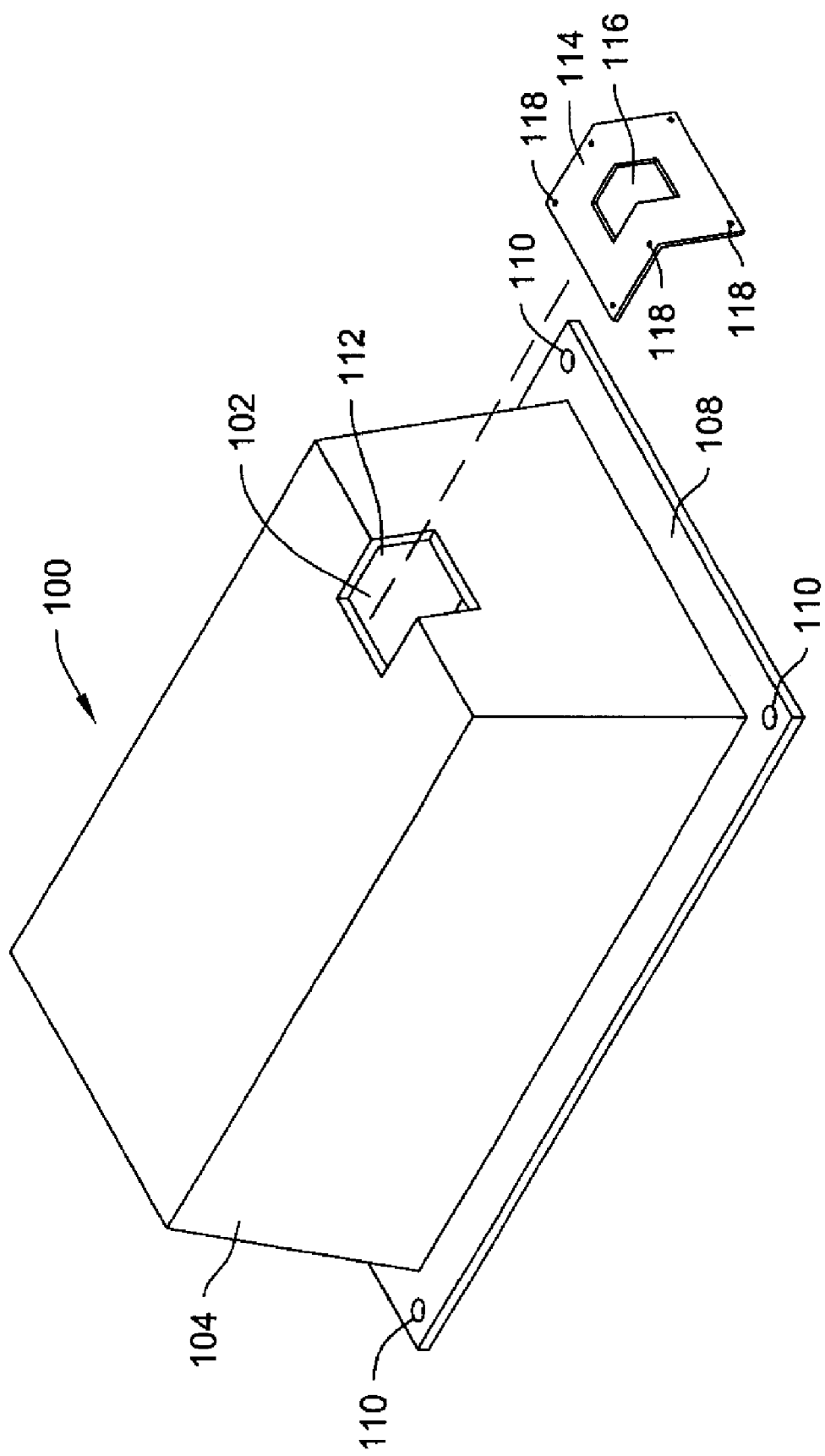
FIG. 1 is a perspective diagrammatic exploded view of a box 100 for providing fire resistance according to the invention.

Reference is now made to the figures, in which like element numbers refer to like elements throughout. FIG. 1 is a perspective view of a box 100, which includes a wall 104 defining cavity 102. Flange 108 is disposed proximate to an opening below through which an electrical device may be installed. It is to be understood that, while wall 104 is shown in FIG. 1 to be comprised of five flat surfaces and the opening, any shape defined by a cavity and having an opening may be suitable. For example, a cylinder open at one end may be suitable. As another example, the box depicted tapers slightly away from the flange; boxes which do not taper are also contemplated. Flange 108 provides a generally planar surface for convenient mounting of the box in a fire barrier. Flange 108 may include holes 110 for use with fasteners such as screws.

Wall 104 includes an additional opening 112 for providing service to a fixture installed in cavity 102. Opening 116 is generally significantly larger than may be required simply to pass conduit through. Opening 116 may be large enough to install a ballast to a light fixture or may be large enough to work on a fixture installed in cavity 102. Opening 112 is covered by a panel 114. Panel 114 includes a panel opening 116 and may include holes 118 for the installation of fasteners such as self-tapping screws. Panel 114 and opening 112 are configured in this embodiment as covering two faces of wall 104. Other configurations, for example a flat panel covering only one face, are contemplated. Panel 114 may be installed over opening 112 and may be wide enough to cover opening 112 and to be installed in a preferred position. For example, panel 114 may be positioned more to one side but still cover opening 112 so that panel opening 116 may be installed in a preferred position. Panel opening 116 may be just large enough to pass conduit through or may be larger, for example to make it easier to grab conduit and pass it through. Panel opening 116 and opening 112 may be preformed or may be punch-outs.

Figure 2:
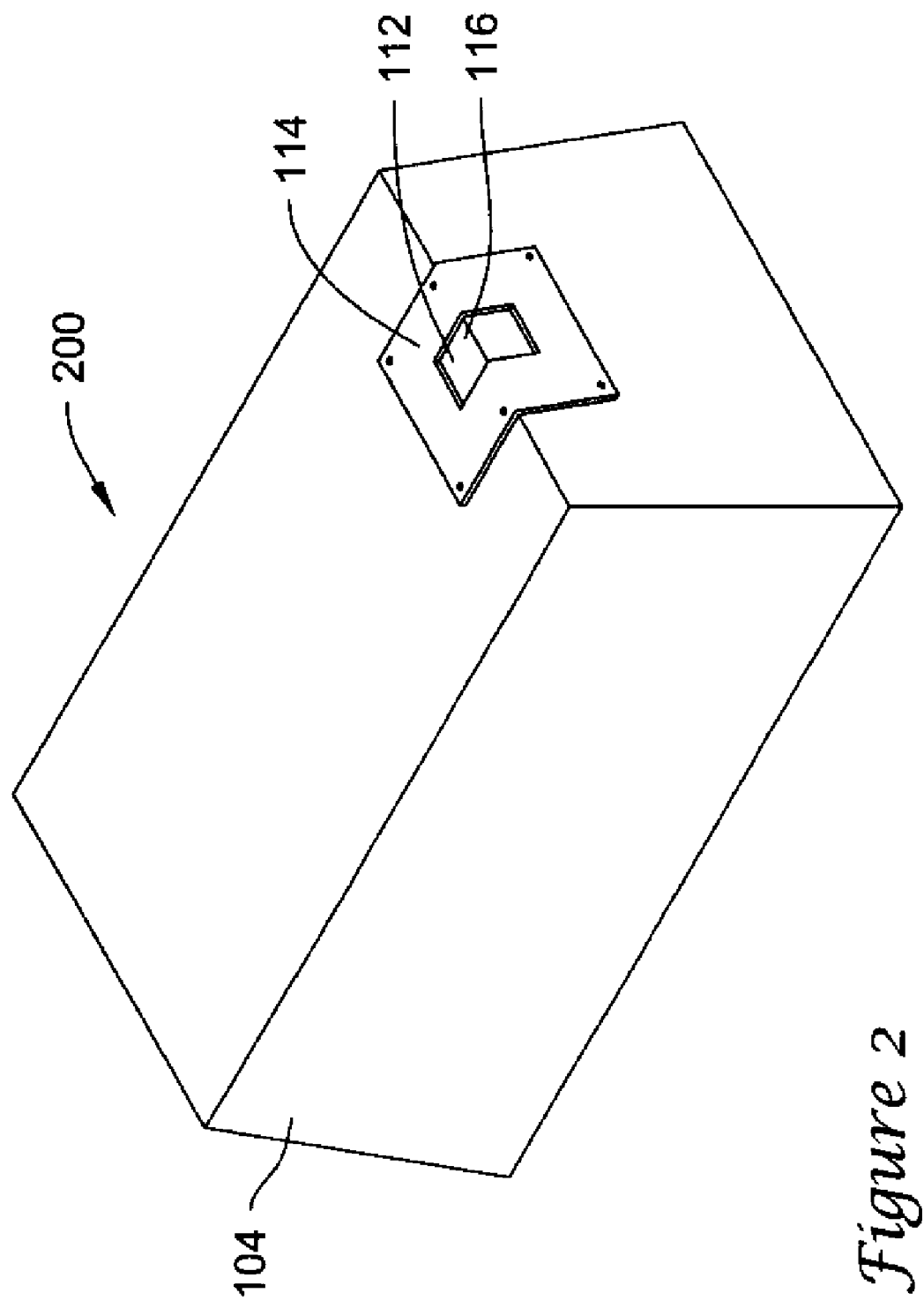
FIG. 2 is a perspective diagrammatic view of box 200 for providing fire resistance according to the invention.

Refer to FIG. 2, which is a perspective view of box 200. Box 200 has a wall 104 defined by a cavity but lacks a flange like flange 108 of the previous embodiment. This configuration may be suitable for use in a fire barrier where fastening the fire barrier to a structural member with nails or screws is not necessary or possible. For example, box 200 may be used in a drop ceiling fire barrier. Of course, box 200 may still be fastened to another part of the fire barrier if desired. Wires or other suitable fastening members may be used. Box 200 includes an opening 112, which in this view is covered by panel 114 having an opening 116 therethrough.

Boxes 100 and 200 are made from a fire-resistant material such as steel. In one embodiment, a box is made from 24-gauge galvanized stainless steel. The box should be impervious to air where an opening as described above is not designed into the box. This may be accomplished during the manufacturing process. For example, if the faces of the box are welded together, the weld may run the length of the seam. The box may also be made using techniques such as stamping or hydroforming. Hydroforming is a technique where fluid pressure is used in the place of a punch to form material. These latter techniques eliminate the need to seal seams, as no seams need be created during the manufacturing process.

Boxes 100 and 200 may also include an intumescent material. An intumescent material is one that expands when in contact with fire or high heat but resists further deterioration. Many intumescent materials expand to eight or more times their original volume, producing a char which has a high fire resistance. Suitable intumescent materials may be procured from 3M Corporation or other suitable supplier. The intumescent material may seal gaps which are not sealed during the manufacturing process. For example, panel 114 may be coated with an intumescent paint or mastic or opening 116 may be filled with an intumescent gasket or putty, either before or after the conduit is passed through. In another alternative, opening 116 may be defined by a pre-installed intumescent gasket. Thus, if the box is exposed to fire, the intumescent material will expand to seal any gaps in the box, rendering the box impervious to air, smoke or flame flow.

Figure 3:
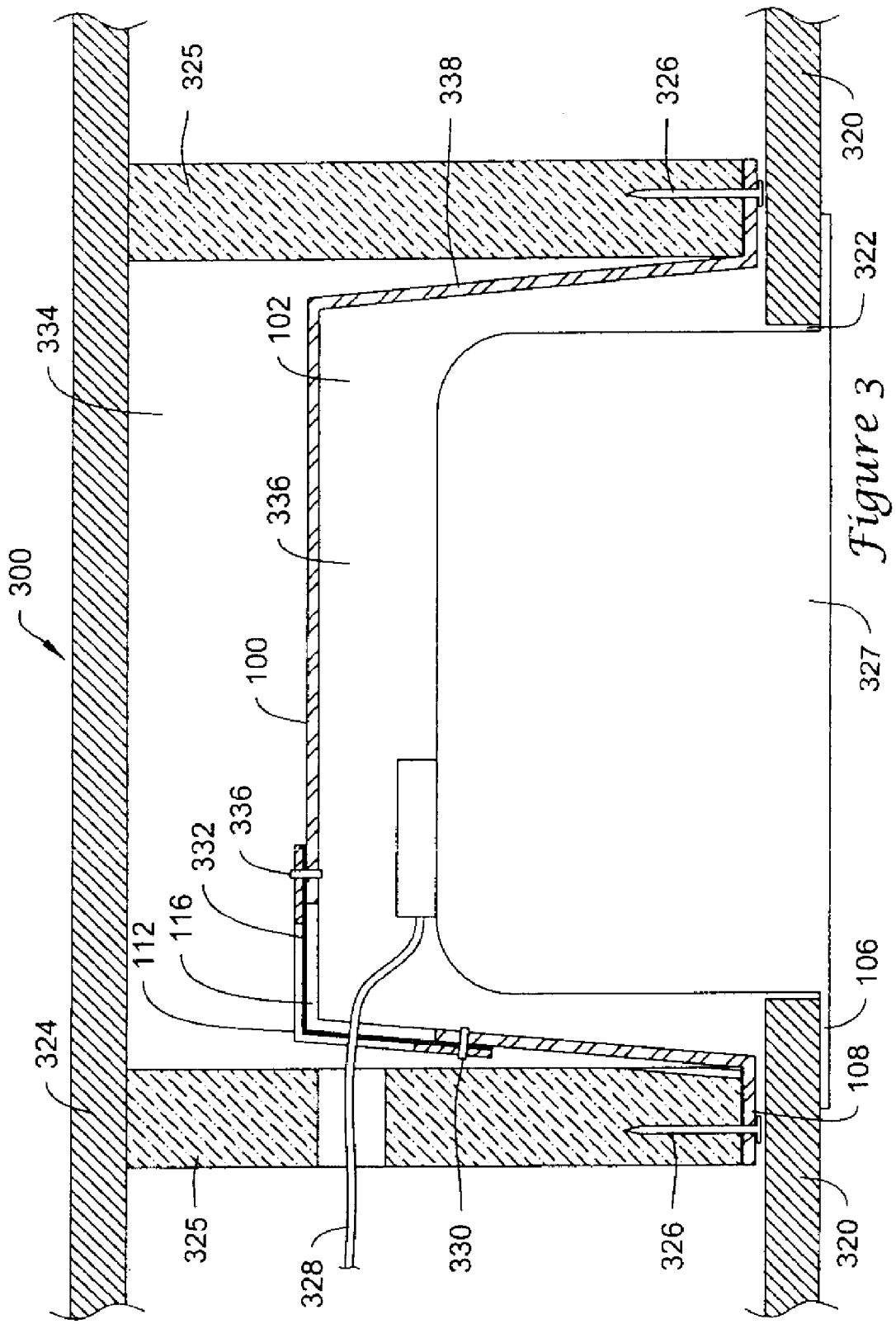
FIG. 3 is a cross-sectional diagrammatic view of a box in a fire barrier 300.

FIG. 3 depicts fire barrier 300 having a box 100 installed therein. Fire barrier 300 is disposed in a building; suitable fire barriers may comprise a floor and a ceiling, a ceiling and a roof, or a wall and a wall. The fire barrier depicted in FIG. 3 comprises a ceiling and the floor above. Fire barrier 300 may be comprised of a first layer 320 having a lumen 322 therein, a second layer 324, and box 100 disposed therebetween. Fire barrier 300 may also comprise structural members 325, such as joists, to which box 100 may be fastened using fasteners 326. Box 100 may also be fastened using other suitable means such as a high temperature epoxy or spot welding.

Lumen 322 generally has a perimeter which may be smaller than the perimeter 230 of opening 106. Layer 320, therefore, may extend over flange 108. A device 327 may be disposed in lumen 322 and extend into cavity 102. This device may be any device installed in a fire barrier. Device 327 is a fluorescent fixture having wires 328 extending therefrom. Wires 328 extend through panel opening 116 and opening 112. Panel 114 has been attached to wall 104 using self-tapping screws 330. Of course, any suitable alternative to self-tapping screws may be used. For example, a high-temperature adhesive may be used. Installed between panel 114 and box wall 104 is an intumescent gasket 332. There may be a gap 334 between wall 104 and layer 324, and there may also be a gap 336 between device 327 and wall 104. These gaps may enhance the fire resistance of fire barrier 200.

Layers 320 and 324 may comprise materials well known by those of skill in the art such a gypsum board, plywood, plaster or tile. Box 100 may be comprised of steel or other material having a melting temperature, for example, above 1700° Fahrenheit such as ceramic. For example, box 100 may be comprised of 24-gauge stainless steel. This material may be galvanized to resist corrosion. Wall 100 may have a perimeter wall 338 that has an angle with the flange of greater than 90 degrees. This may facilitate stacking of boxes 100.

Fire barrier 200 may have an ASTM E-119 fire resistance rating of at least 1 hour or at least 2 hours. The term "fire resistant" is herein defined to refer to the ability of a structure to serve as a barrier to the spread of fire. To serve as an effective barrier to the spread of fire, a structure must exhibit the following characteristics. First, it must not pass flame or hot gas from one side to the other. Second, the structure must support the imposed design loads without structural failure or collapse. Third, the structure must resist the transmission of heat so that the surface not exposed to the fire does not exceed the temperature of 250° Fahrenheit. Fourth, the structure must withstand lateral impacts from falling debris. This is definition of the term "fire resistant" as understood by those of skill in the art.

A fire resistance rating of 1 hour exposes one side of the fire barrier to the following sequence of temperatures: 1000° F. for 5 minutes, 1400° F. for 15 minutes, 1550° F. for 30 minutes, and 1700° F. for 10 minutes. A fire resistance rating of 2 hours exposes the side of the fire barrier to 1700° F. for an additional 50 minutes and to a temperature of 1850° F. for 10 minutes. At no time during this test should the fire barrier permit flames or hot gases through to the unexposed surface or allow the unexposed surface to exceed 250° F. This test was designed to simulate the conditions to which a real fire might expose a fire barrier. Of course, if this test is updated to reflect new understandings of the conditions of a fire, the fire barrier should be capable of a comparable rating under the new test.

Fire barrier 300 may be rated under ASTM E-119 or a comparable test. The process of rating includes creating a fire barrier 300 and subjecting it to the test. A rated fire barrier 300 may permit installation of box 100 in fire barriers governed by regulations. Certification of the rating may be included with box 100. Certification may also be affixed on box 100, either on a label or permanently impressed into box 100 by stamping, etching or some similar process.

Figure 4:
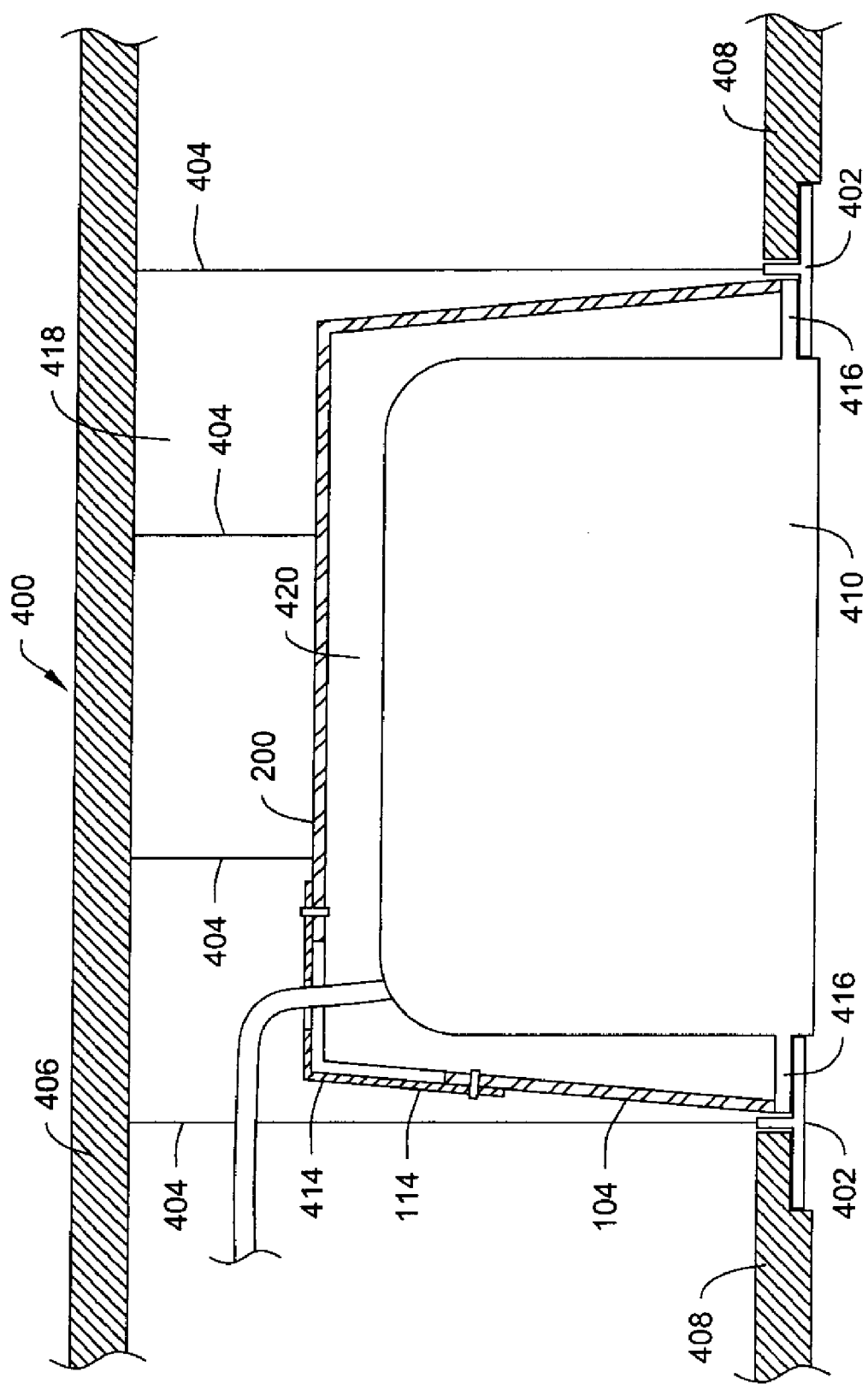
FIG. 4 is a cross-sectional diagrammatic view of a box in a fire barrier 400.

FIG. 4 is a cross-sectional diagrammatic side view of a fire barrier 400 having box 200 installed therein. Figure barrier 400 is a drop ceiling. Thus, T-bars 402 are hung using wires 404 from a structural member 406. Structural member 406 may be a panel, a series of joists or other typical structure. T-bars 402 form a grid of cavities. Typically, most of these cavities are filled with ceiling panels 408. Some of these cavities are often filled with fixtures such as fans or such as box light 410. Box 200 is installed over box light 410 to preserve the integrity of the fire barrier. Box 200 has panel 114 attached to box wall 104. Conduit 412 passes through opening 112 and panel opening 116. An intumescent putty 414 fills panel opening 116. Box 200 may rest on an edge 416 of box light 410 or may rest directly on T-bars 402. Box 200 may be attached to structure member 406 with wires 404 if desired, or may be attached to the structural member or T-bars using any suitable fastening member. There may be a gap 418 between box 200 and structural member 406 and another gap 420 between box wall 104 and box light 410. Box 200 may have a fire rating of one hour or more as installed in a fire barrier 400, and certification thereof.

Numerous advantages of the invention covered by this document have been set forth in the foregoing description. It will be understood, however, that this disclosure is, in many respects, only illustrative. Changes may be made in details, particularly in matters of shape, size and arrangement of parts without exceeding the scope of the invention.

The invention's scope is, of course, defined in the language in which the appended claims are expressed.

What is claimed is:

1. A fire resistant assembly, comprising:
   a first layer of a material suitable for use as a fire barrier having a lumen therein;
   a second layer of a material suitable for use as a fire barrier adjacent the first layer;
   a fire resistant box having a cavity defined by a plurality of walls, a first opening in the plurality of walls having a first perimeter, a second opening in the plurality of walls having a second perimeter, a panel fastened over the second opening, the panel and at least one of the plurality of walls forming a third opening having a third perimeter smaller than the second perimeter, the third opening being an opening through at least on of the walls and the panel; and
   wherein the box is disposed between the first layer and the second layer and wherein the first opening is disposed on the lumen of the first layer.

2. The assembly of claim 1, wherein both the panel and at least one of the plurality of walls defines the third perimeter.

3. The assembly of claim 2, wherein the panel defines all of the third perimeter.

4. The assembly of claim 2, wherein the panel, prior to fastening, is adjustable relative to the box such that the third opening may be in one of two or more possible positions.

5. The assembly of claim 1, wherein the plurality of walls comprises a base section and a perimeter section joined at an edge, wherein the second opening is disposed through the base section and the perimeter section and extends through the edge.

6. The assembly of claim 5 wherein the base section and the perimeter section form an angle of between about 90° and about 135°.

7. The assembly of claim 5 wherein the base section is flat.

8. The assembly of claim 7 wherein the perimeter section includes four flat walls.

9. The assembly of claim 8 wherein the perimeter section includes no more than four flat walls.

10. The assembly of claim 1, wherein the box further comprises a plurality of fasteners joining at least one of the plurality of walls to the panel.

11. The assembly of claim 10, wherein the fasteners are self-tapping screws.

12. The assembly of claim 1, further comprising an intumescent material sealing the panel to the box.

13. The assembly of claim 12, wherein the intumescent material is a putty.

14. The assembly of claim 1, wherein the box comprises steel.

15. The assembly of claim 14, wherein the box comprises 24-gauge galvanized stainless steel.

16. The assembly of claim 15, wherein the electrical device is a rectangular light fixture.

17. The assembly of claim 1, having an American Society for Testing and Materials (ASTM) E-119 fire endurance rating of at least 1 hour.

18. The assembly of claim 1, further comprising an electrical device disposed through the first opening and at least partially in the cavity.

19. The assembly of claim 1, wherein the box further comprises a flange proximate the first opening.

20. The assembly of claim 1, further comprising a suspension wire and wherein the second layer comprises a ceiling tile.

21. The assembly of claim 20, further comprising a tie between the first layer and the box.

22. The assembly of claim 21, wherein the tie is a wire.

23. A method of providing a fire barrier in a building, the steps comprising:
   providing a first layer of a material suitable for use as a fire barrier;
   providing a lumen in the first layer;
   providing a second layer of a material suitable for use as a fire barrier;
   providing a box of a material suitable for use as a fire barrier, the box having a cavity defined by a plurality of walls, a first opening in at least one of the plurality of walls, and a second opening in at least one of the plurality of walls such that the opening in the box covers the lumen in the first layer,
   disposing a device in the lumen and extending into the cavity of the box;
   disposing a conduit through the second opening; and
   attaching a panel to at least one of the plurality of walls of the box to
   at least partially close the second opening,
   wherein the box is disposed between the first layer and the second layer and wherein the first opening is disposed on the lumen of the first layer.

24. The method of claim 23, wherein the step of attaching the panel to the plurality of walls of the box includes the step of providing an opening in the panel such that when the panel is attached to the box, an opening through at least one of the plurality of walls smaller than the second opening is formed.

25. The method of claim 24, further comprising the step of sealing any gap between the conduit and the second opening.

26. The method of claim 23, further comprising the step of sealing a joint between the box and the panel.

27. The method of claim 26, wherein the step of sealing the joint includes the step of providing intumescent material to seal the joint.

28. The method of claim 26, wherein the joint is substantially airtight after it has been sealed.

29. The method of claim 28, wherein the second layer is a suspending ceiling, wherein the light fixture is designed to drop into a suspended ceiling cell, and wherein the box is designed to drop into the suspended ceiling cell around the light fixture.

30. The method of claim 23, wherein the step of attaching the panel includes the step of screwing the panel to the box.

31. The method of claim 23, wherein the step of attaching the panel includes the step of selecting a position among two positions for the installation of the panel relative to the box.

32. The method of claim 23, further comprising the step of providing a light fixture.

* * * * *